3,398,170
MIXED CHELATES OF A SCHIFF BASE, AN AMINE, AND A TRANSITION SERIES METAL
Henryk A. Cyba, Evanston, Ill., assignor to Universal Oil Products Company, Des Plaines, Ill., a corporation of Delaware
No Drawing. Filed May 21, 1964, Ser. No. 369,303
10 Claims. (Cl. 260—439)

ABSTRACT OF THE DISCLOSURE

A chelate of (1) a Schiff base of an o-hydroxy-aromatic aldehyde and an o-hydroxyaromatic amine, (2) an alkyl amine, cycloalkyl amine or alkanol amine and (3) a metal of the transition series such as nickel or cobalt. The chelates of this invention are useful as stabilizing additives for plastics, rubber, hydrocarbon distillates and other organic substrates.

---

This invention relates to a chelate of a Schiff base and a nitrogen-containing compound as will be hereinafter described in detail. The novel chelate of the present invention possesses varied utility and is particularly useful as an additive to plastics to stabilize the same against the effects of weathering.

In one embodiment the present invention relates to a chelate of (1) a Schiff base of o-hydroxy-aromatic aldehyde and an o-hydroxyaromatic amine, (2) a compound selected from the group consisting of alkyl amine, cycloalkyl amine and alkanol amine and (3) a metal of the transition series.

In a specific embodiment the present invention relates to a chelate of (1) a Schiff base of salicylaldehyde and p-alkyl-o-aminophenol, (2) aliphatic amine and (3) nickel.

In another embodiment the present invention relates to a chelate of (1) a Schiff base of o-vanillin and o-aminophenol, (2) cyclohexyl amine and (3) cobalt.

In still another embodiment the present invention relates to plastic normally subject to weathering stabilized against such weathering by the incorporation therein of a chelate of the present invention.

As hereinbefore set forth, one component of the chelate of the present invention is a Schiff base of an o-hydroxyaromatic aldehyde and an o-hydroxyaromatic amine. Any suitable o-hydroxyaromatic aldehyde may be used in accordance with the present invention. A particularly preferred o-hydroxyaromatic aldehyde is salicylaldehyde. In another embodiment a substituted o-hydroxybenzaldehyde is employed including particularly o-vanillin (2-hydroxy-3-methoxybenzaldehyde). Other substituted o-hydroxybenzaldehydes include 2-hydroxy-3-methylbenzaldehyde,
2-hydroxy-3-ethylbenzaldehyde,
2-hydroxy-3-propylbenzaldehyde,
2-hydroxy-3-butylbenzaldehyde,
2-hydroxy-3-pentylbenzaldehyde,
2-hydroxy-3-hexylbenzaldehyde,
2-hydroxy-3-heptylbenzaldehyde,
2-hydroxy-3-octylbenzaldehyde,
2-hydroxy-3-nonylbenzaldehyde,
2-hydroxy-3-decylbenzaldehyde,
2-hydroxy-3-undecylbenzaldehyde,
2-hydroxy-3-dodecylbenzaldehyde,
2-hydroxy-3-tridecylbenzaldehyde,
2-hydroxy-3-tetradecylbenzaldehyde,
2-hydroxy-3-pentadecylbenzaldehyde,
2-hydroxy-3-hexadecylbenzaldehyde,
2-hydroxy-3-heptadecylbenzaldehyde,
2-hydroxy-3-octadecylbenzaldehyde,
2-hydroxy-3-nonadecylbenzaldehyde,
2-hydroxy-3-eicosylbenzaldehyde, etc.,
2-hydroxy-3-ethoxybenzaldehyde,
2-hydroxy-3-propoxybenzaldehyde,
2-hydroxy-3-butoxybenzaldehyde,
2-hydroxy-3-pentoxybenzaldehyde,
2-hydroxy-3-hexoxybenzaldehyde,
2-hydroxy-3-heptoxybenzaldehyde,
2-hydroxy-3-octoxybenzaldehyde,
2-hydroxy-3-nonoxybenzaldehyde,
2-hydroxy-3-decoxybenzaldehyde,
2-hydroxy-3-undecoxybenzaldehyde,
2-hydroxy-3-dodecoxybenzaldehyde,
2-hydroxy-3-tridecoxybenzaldehyde,
2-hydroxy-3-tetradecoxybenzaldehyde,
2-hydroxy-3-pentadecoxybenzaldehyde,
2-hydroxy-3-hexadecoxybenzaldehyde,
2-hydroxy-3-heptadecoxybenzaldehyde,
2-hydroxy-3-octadecoxybenzaldehyde,
2-hydroxy-3-nonadecoxybenzaldehyde,
2-hydroxy-3-eicosoxybenzaldehyde, etc.

The alkyl and/or alkoxy substituents hereinbefore set forth are generally preferred in one embodiment of the invention. However, it is understood that the alkyl or alkoxy substituent may be positioned in the 4,5- or 6-position on the phenyl ring and that two or more of these substituents may be attached to the phenyl ring. In another embodiment, in addition to or in place of the alkyl and/or alkoxy groups, other substituents may be attached to the phenyl ring of the benzaldehyde and such substituents may comprise cyclic, cyclic-oxy, cyclic-thioxy or cyclic-amino substituents. In another embodiment the hydrogen of the —CHO group of o-hydroxybenzaldehyde is replaced with an alkyl group providing an o-hydroxyaryl alkyl ketone as illustrated by 2-hydroxyacetophenone, 2 - hydroxypropiophenone, 2 - hydroxybutyrophenone, 2 - hydroxyvalerophenone, 2 - hydroxycaprylophenone, 2 - hydroxylaurylphenone, 2 - hydroxypalmitylphenone, etc. In still another embodiment, the hydrogen of the —CHO group of salicylaldehyde is replaced with a phenyl or substituted phenyl group providing, for example, 2-hydroxybenzophenone, 2-hydroxy-4 - alkylbenzophenone, 2 - hydroxy - 4' - alkylbenzophenone, 2 - hydroxy - 4 - alkoxybenzophenone, 2 - hydroxy-4'-alkoxybenzophenone, etc.

The other component of the Schiff base is an o-hydroxyaromatic amine which also may be named as an o-aminophenol. While o-aminophenol may be used in the preparation of the Schiff base, it is preferred that the o-aminophenol contains at least one hydrocarbyl of at least three carbon atoms and preferably of from five to twenty carbon atoms. In a preferred embodiment the substituent is an alkyl group of at least three and still more particularly of from about five to about twenty carbon atoms. Illustrative preferred compounds include p-pentyl-o-aminophenol, p-hexyl-o-aminophenol, p-heptyl-o-aminophenol, p-octyl-o-aminophenol, p-nonyl-o-aminophenol, p-decyl-o-aminophenol, p-undecyl-o-aminophenol, p-dodecyl-o-aminophenol, etc. In another preferred embodiment, the substituent is an alkoxy group. Illustrative preferred compounds include p-methoxy-o-aminophenol, p-ethoxy-o-aminophenol, p - propoxy - o - aminophenol, p - butoxy-o-aminophenol, p-pentoxy-o-aminophenol, p-hexoxy-o-aminophenol, etc. In still another embodiment the substituent is selected from aralkyl, aryl, alkaryl, alkylcycloalkyl, cycloalkylalkyl, aryloxy, alkaryl, arylalkoxy, etc. When only one such substituent is attached to the aminophenol ring, it preferably is in the 4-position, with respect to the hydroxyl group, although it may be in the 3-, 5- or 6-positions. When two or more of such substituents are present, at least one substituent preferably is in the 4-position and the other substituent or substituents preferably will be in the 6- and/or 5-positions. While the substituted o-aminophenol is preferred, it is understood that, in another embodiment of the invention, the correspondingly substituted o-aminonaphthol may be used for reaction with the o-hydroxy-aromatic aldehyde but not necessarily with equivalent results.

In still another embodiment the o-hydroxyaromatic amine is o-hydroxyaminodiphenyl amine, o-hydroxyaminodiphenol sulfide, o-hydroxyaminodiphenyl methane, o-hydroxyaminodiphenyl ethane, o-hydroxyaminodiphenyl propane, o-hydroxyaminodiphenyl butane, etc., and these diphenyl compounds containing hydrocarbyl or hydrocarbyloxy substituents attached to one or both of the phenyl rings. Also included are N,N'-diaminodiphenyl amines, sulfides and alkanes in which both of the hydrogens attached to one of the terminal nitrogens are replaced by substituents, the substituents preferably comprising alkyl, although they may comprise cycloalkyl, aryl or a mixture thereof.

The reaction of the o-hydroxyaromatic aldehyde and o-hydroxyaromatic amine is effected in any suitable manner. The reaction is effected using equal mole proportions of the aldehyde and amine, with the liberation of one mole proportion of water. When desired, an excess of one of the reactants may be used in order to assure complete reaction. While the reaction may be effected at room temperature or slightly above, it generally is preferred to effect the reaction at refluxing conditions. The exact temperature will depend upon the particular solvent employed. For example, when benzene is used as the solvent, the temperature is about 80° C. Corresponding higher refluxing temperatures are employed when using toluene, xylene, ethyl benzene, cumene, etc., as the solvent. In another embodiment an alcohol solvent is used including methanol, ethanol, propanol, butanol, etc., or other oxygenated solvents as ethers, glycols, polyglycol ethers, dialkyl sulfoxides, dialkyl amides, etc., may be used. Accordingly, the reaction temperature may be within the range of room temperature or slightly higher to 200° C. or more. When desired, the salicylaldehyde and aminophenol may be prepared as separate solutions in a solvent and introduced in this manner into the reaction zone, or either one or both of these compounds may be introduced into the reaction zone and the solvent separately supplied thereto. The refluxing or stirring of the heated reactants is continued for a time sufficient to effect substantially complete reaction, which time may range from 0.1 to 10 hours or more. In this reaction, water is formed and preferably is continuously removed from the reaction zone. Following completion of the reaction, the resultant Schiff base may be separated from the solvent or may be allowed to remain in solution.

The Schiff base, prepared as hereinbefore described, comprises one component of the chelate of the present invention. Another component of the chelate is selected from the group consisting of alkyl amine, cycloalkyl amine and alkanol amine. In the case of an alkanol amine, the product is a mixed chelate. Any suitable alkyl amine may be used in the present invention. The alkyl amine may be a primary, secondary or tertiary alkyl amine and a mono- or polyamine. While the amine may comprise methyl amine and ethyl amine, it generally is preferred that the amine contains from 3 to about 20 carbon atoms. Illustrative primary monoamines include propyl amine, butyl amine, pentyl amine, hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, etc. It is understood that the amine may contain branching in the chain. Illustrative secondary amines include dimethyl amine, diethyl amine, dipropyl amine, dibutyl amine, dipentyl amine, dihexyl amine, diheptyl amine, dioctyl amine, dinonyl amine, didecyl amine, diundecyl amine, didodecyl amine, ditridecyl amine, ditetradecyl amine, dipentadecyl amine, dihexadecyl amine, diheptadecyl amine, dioctadecyl amine, dinonadecyl amine, dieicosyl amine, etc., or mixed amines as illustrated, for example, by methyl decyl amine, ethyl octyl amine, propyl hexyl amine, butyl octyl amine, etc. Illustrative tertiary amines include trimethyl amine, triethyl amine, tripropyl amine, tributyl amine, tripentyl amine, trihexyl amine, triheptyl amine, trioctyl amine, trinonyl amine, tridecyl amine, etc., and mixed trialkyl amines.

Illustrative alkylene polyamines include ethylene diamine, propylene diamine, butylene diamine, pentylene diamine, hexylene diamine, etc., diethylene triamine, dipropylene triamine, dibutylene triamine, dipentylene triamine, dihexylene triamine, etc., triethylene tetramine, tripropylene tetramine, tributylene tetramine, tripentylene tetramine, trihexylene tetramine, etc., tetraethylene pentamine, tetrapropylene pentamine, tetrabutylene pentamine, tetrapentylene pentamine, tetrahexylene pentamine, etc., and particularly these alkylene polyamines in which one or both of the terminal nitrogen atoms are each substituted by one or two hydrocarbyl groups and particularly alkyl, cycloalkyl and aryl radicals.

A preferred cycloalkyl amine for use in the present invention is cyclohexyl amine. Other cycloalkyl amines include cyclobutyl amine, cyclopentyl amine, cycloheptyl amine, cyclooctyl amine, cyclononyl amine, cyclodecyl amine, etc. Also included are dicycloalkyl amines and tricycloalkyl amines, the cycloalkyl groups being selected from those hereinbefore set forth and preferably comprising cyclohexyl. It is understood that the cycloalkyl group or groups may contain alkyl, aryl or other hydrocarbyl groups or alkoxy or aryloxy groups attached thereto.

Any suitable alkanol amine is used in the present invention and may comprise a mono-, di- or trialkanol amine. Illustrative monoalkanolamines include ethanol amine, propanol amine, butanol amine, pentanol amine, hexanol amine, heptanol amine, octanol amine, nonanol amine, decanol amine, undecanol amine, dodecanol amine, tridecanol amine, tetradecanol amine, pentadecanol amine, hexadecanol amine, heptadecanol amine, octadecanol amine, nonadecanol amine, eicosanol amine, etc. Illustrative dialkanol amines include dimethanol amine, diethanol amine, dipropanol amine, dibutanol amine, dipentanol amine, dihexanol amine, diheptanol amine, dioctanol amine, dinonanol amine, didecanol amine, diundecanol amine, didodecanol amine, etc. Illustrative trialkanol amines include trimethanol amine, triethanol amine, tripropanol amine, tributanol amine, tripentanol amine, trihexanol amine, triheptanol amine, trioctanol amine, trinonanol amine, tridecanol amine, etc. It is understood that mixed alkanol amines may be used in the present invention.

In still another embodiment the alkanol amine may comprise a polyamino compound in which one or more of the nitrogens are substituted by a hydroxyalkyl radical and, when desired, one or more of the nitrogen atoms also is substituted by a hydrocarbyl radical. Illustrative but not limiting examples in this embodiment include aminoethyl ethanolamine, aminopropyl ethanolamine, aminobutyl ethanolamine, etc., and particularly these compounds in which one or both of the nitrogen atoms are substituted by alkyl groups as illustrated, for example, in compounds as N-butyl-aminoethyl ethanolamine, N-pentyl-aminoethyl ethanolamine, N-hexyl-aminoethyl ethanolamine, N-heptyl-aminoethyl ethanolamine, N-octyl-aminoethyl ethanolamine, N-nonyl-aminoethyl ethanolamine, N-decyl-aminoethyl ethanolamine, N-undecyl-aminoethyl ethanolamine, N-dodecyl-aminoethyl ethanolamine, etc., N,N-dimethyl ethanolamine, N,N-diethyl ethanolamine, N,N-dipropyl ethanolamine, N,N-dibutyl ethanolamine, N,N-dipentyl ethanolamine, N,N-dihexyl ethanolamine, N,N-diheptyl ethanolamine, N,N-dioctyl ethanolamine, N,N-dinonyl ethanolamine, N,N-didecyl ethanolamine, etc., N-butyl-N-hydroxy-ethyl-aminoethyl ethanolamine, N-pentyl-N-hydroxyethyl-aminoethyl ethanolamine, N-hexyl-N-hydroxyethyl-aminoethyl ethanolamine, N - heptyl - N - hydroxyethyl-aminoethyl ethanolamine, N-octyl-N-hydroxyethyl-aminoethyl ethanolamine, N-nonyl-N - hydroxyethyl - aminoethyl ethanolamine, N-decyl-N-hydroxyethyl-aminoethyl ethanolamine, etc., bis-(N - butyl - N - hydroxyethyl - aminoethyl) ethanolamine which also may be named $N^1,N^3$-dibutyl-$N^1,N^2,N^3$-tri-(2-hydroxyethyl) diethylene-triamine, bis-(N-pentyl-N-hydroxyethyl-aminoethyl) ethanolamine, bis-(N-hexyl-N-hydroxyethyl-aminoethyl) ethanolamine, bis-(N-heptyl-N-hydroxyethyl-aminoethyl) ethanolamine, bis-(N-octyl-N-hydroxyethyl-aminoethyl) ethanolamine, bis-(N-nonyl-N-hydroxyethyl-aminoethyl) ethanolamine, bis-(N-decyl-N-hydroxyethyl-aminoethyl) ethanolamine, etc., and corresponding compounds in which one or more of the hydroxyethyl groups are replaced by hydroxypropyl, hydroxybutyl, hydroxypentyl, hydroxyhexyl, etc.

From the above description, it will be seen that a number of different amines and alkanol amines may be used in accordance with the present invention. However, all of these compounds are not necessarily equivalent but all of them will serve to form a mixed chelate of the present invention.

The chelate of the present invention is formed in any suitable manner. Any suitable metal of the transition series of elements is used in preparing the chelate. In a preferred embodiment the metals are of the first transition series of elements. Nickel is particularly preferred. Other metals in the first transition series include cobalt, iron, manganese, chromium, vanadium and titanium. Next in preference are molybdenum and tungsten of the second and third transition series, respectively. While the metals in divalent state with a coordination number of 4 are preferred, metals having a coordination number of 6 are also feasible. Metals in trivalent or even tetravalent state with a coordination number of 6 also are useful.

The chelate is formed by reacting a suitable compound of the metal, either simultaneously or successively, with the Schiff base and amine or alkanol amine. A preferred compound of nickel is nickel chloride. Other soluble compounds of nickel include nickel acetate tetrahydrate, nickel bromide trihydrate, nickel carbonyl, nickel chloride hexahydrate, nickel formate, nickel nitrate hexahydrate, nickel sulfate hexahydrate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc. Soluble compounds of iron include ferrous acetate, ferrous bromide, ferrous chloride, ferric oxalate, etc. Manganese compounds include manganese acetate, manganese chloride, manganese nitrate, etc. Chromium compounds include chromic bromide hexahydrate, chromic chloride hexahydrate, chromic nitrate nonahydrate, etc.

In one method the Schiff base is reacted with the metal compound and then is reacted with the amine or alkanol amine. This reaction is effected in any suitable manner. For example, the Schiff base in alcoholic solution is first reacted with an alkali metal hydroxide alcoholic solution and then is reacted with nickel chloride. The reaction temperature generally will be in the range of from 20° C. to refluxing temperature which may be as high as 200° C. In certain cases, it is unnecessary to first react with an alkali metal hydroxide. Preferred alkali metal hydroxides comprise sodium hydroxide and potassium hydroxide, although other alkali metal hydroxide solutions may be used, as well as calcium, magnesium, strontium or barium hydroxides. The alkali metal hydroxide is used in a proportion of two moles thereof per one mole of the Schiff base.

The Schiff base and metal are reacted in equal mole proportions and the resultant chelate is reacted with the amine or alkanolamine, the amine or alkanol amine being used in one or three mole proportions per one mole proportion of Schiff base-metal chelate. In one method, the mixture of nickel-Schiff base and amine or alkanol amine is subjected to refluxing, preferably in the presence of a suitable solvent which conveniently comprises an alcohol and particularly methanol. Other alcohols include ethanol, propanol, butanol, etc. The refluxing is continued until formation of the mixed chelate is completed, which generally may be determined by the change in color of the reaction product.

In another method of preparation, one mole proportion of the Schiff base, one or three mole proportions of the amine or alkanol amine and one mole proportion of the metal compound, together with a suitable solvent, are all charged into a reaction flask and the mixture is subjected to refluxing. The refluxing is continued until formation of the chelate is completed. Here again, the alkali metal hydroxide salt of the Schiff base is formed prior to the formation of the chelate. The resulting alkali metal salt as, for example, sodium chloride when nickel chloride is used in forming the chelate, is water soluble and is removed from the process by water washing. In another method the chelate may be purified by recrystallization from a suitable solvent including, for example, benzene, toluene, xylene, etc., n-pentane, n-hexane, n-heptane, etc. The chelate of the present invention is recovered as a solid which is readily soluble in most organic substrates.

From the above description, it will be seen that a number of different chelates are included within the scope of the present invention. However, it is understood that the different mixed chelates are not necessarily equivalent in their activity or use for the same or different purposes and that a mixture of different chelates may be prepared and used in accordance with the present invention.

The novel chelates of the present invention possess varied utility. As hereinbefore set forth, they are of especial utility in substrates exposed to weather and, in this embodiment, the chelates of the present invention serve as weathering stabilizers. In addition, the chelates also serve as mold release agents, anti-blocking agents, anti-static agents, dyeing aids, antioxidants and peroxide decomposers, etc. The substrates normally subject to exposure to weather include plastics, resins, paints, varnishes, other coatings, fibers, textiles, etc.

Illustrative plastics which are stabilized by the novel chelates of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, light weight outdoor furniture, awnings, cover for greenhouses, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc.

Still other plastics are prepared from other monomers and are available commercially. Illustrative examples include polyurethanes, both the urethane foams and the rigid resins, epoxy resins, etc. Still other illustrative examples include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl celluose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specification and claims. Synthetic rubbers include SBR ruber (copolymer of butadiene and styrene), Buna N (copolymer of butadiene and acrylonitrile), butyl rubber (copolymer of butadiene and isobutylene), neoprene rubber (chloroprene polymer), thiokol rubber (polysulfide), silicone rubber, etc. The natural rubbers includes hevea rubber, caoutchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventive coatings, wax coatings, other protective coatings, etc. It is understood that the mixed chelates of the present invention may be used in any coating which is subject to exposure to ultraviolet light, oxidation, heat, etc. While the mixed chelates are especially useful in materials subject to such exposure, it is understood that the mixed chelates of the present invention also may be used advantageously in other coatings, plastics, resins, paints, etc., which normally are not exposed outdoors.

The chelates of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the chelates of the present invention serve to retard oxidative deterioration caused by metallic components in the oil. The chelates are also proposed as catalysts, especially in such reactions as oxidation, reaction of acetylene with carbon monoxide and alcohol, etc., and as a catalyst or co-catalyst for preparing polyolefins from olefins and dienes.

In many applications it is advantageous to utilize the chelates of the present invention in conjunction with other additives. For example, particularly improved results are obtained in the stabilization of plastics, apparently due to a synergistic effect, when the chelate of the present invention is used in admixture with a phenolic antioxidant including particularly 2,6-ditertiarybutyl - 4-methylphenol. Other inhibitors which may be used generally will be of the phenolic or amine type and include phenyl-alpha-naphthylamine,
phenyl-beta-naphthylamine,
phenothiazine,
Nonox WSP,
Nonox Cl,
dialkylated phenols,
trialkylated phenols including 2,4-di-methyl-6-tertiarybutylphenol, etc.,
Santonox R,
Santowhite,
alkyl-alkoxyphenols,
2246 (2,2'-methylene-bis-(4-methyl-6-tert-butylphenol)) and
425 (2,2'-methylene-bis-(4-ethyl-6-tert-butylphenol)) (American Cyanamid),
diphenyl-p-phenylenediamine,
1,1,3-tris-(2-methyl-4-hydroxy-5-t-butylphenyl)-butane,
703 (2,6-di-tert-butyl-alpha-dimethylamino-p-cresol) (Ethyl Corporation),
4,4'-bis-(2-methyl-6-tert-butylphenol);
4,4'-thio-bis-(6-tert-butyl-o-cresol);
4,4'-bis-(2,6-di-tert-butylphenol);
4,4'-methylene-bis-(2,6-di-tert-butylphenol);
Salol (salicylic acid esters),
p-octyl-phenylsalicylate,
various phosgene-alkylated phenol reaction products,
various alkoxyalkyldihydroxybenzophenones,
polyalkyldihydroxybenzophenones,
tetrahydroxybenzophenones,
2,4,5-trihydroxybutyrophenone, etc., and especially such hydroxybenzophenones as 2,2'-dihydroxy-4-octoxybenzophenone,
2,2'-dihydroxy-4-decoxybenzophenone,
2,2'-dihydroxy-4-dodecoxybenzophenone,
2,2'-dihydroxy-4-octadecoxybenzophenone, etc., in general any alkoxy or cycloalkoxy substituted 2,2'-dihydroxybenzophenones,
2-hydroxy-4'-octoxybenzophenone,
2-hydroxy-4'-decoxybenzophenone,
2-hydroxy-4'-dodecoxybenzophenone, etc., and in general any alkoxy or cycloalkoxy substituted 2-hydroxybenzophenones. Other ultraviolet light stabilizers include nickel-bis-dithiocarbamates and in particular nickel-bis-dibutyldithiocarbamate,
nickel-bis-dihydroxypolyalkylphenol sulfides,
especially [2,2'-thio-bis-(4-t-octylphenolato)]-n-butylamine nickel (II),
dilauryl beta-mercaptodipropionate,
dihydroxytetralkyl sulfides, dihydroxytetralkyl methanes,
various trithiophosphites as trillaurylthiophosphite,
dialkylphosphites,
trialkylphosphites,
high molecular weight nitriles,
various Mannich bases,
various N-hydroxyphenylbenzotriazoles
such as 2-(2'-hydroxy-5'-octylphenyl)-benzotriazole,
2-(2'-hydroxy-5'-dodecylphenyl)-benzotriazole,
2-(2'-hydroxy-5'-octoxyphenyl)-benzotriazole,
2-(2'-hydroxy-5'-dodecoxyphenyl)-benzotriazole,
Tinuvin 326, etc., in general, any alkyl or alkoxyphenyl substituted benzotriazole, etc. The additional inhibitor may be used in a concentration of from about 1% to about 75% by weight of the chelate of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to about 25% but generally will be used in a concentration of from about 0.01% to about 5% by weight of the substrate. When used in hydrocarbon distillate and particularly gasoline, the additive generally is used in a concentration of from about 0.0001% and more particularly 0.01% to about 0.5%. The additive is incorporated in the substrate in any suitable manner. For example, when it is incorporated into a plastic, resin or the like, it may be added to the hot melt, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, decalin, etc.

The following examples are introduced to illustrate further the novelty and utility of the present invention but not with the intention of unduly limiting the same.

EXAMPLE I

The chelate of this example was prepared by first forming the Schiff base of salicylaldehyde and p-octyl-o-aminophenol, then reacting the Schiff base with nickel chloride and finally reacting with isobutyl amine. The Schiff base was prepared by refluxing a mixture of 61 g. (0.5 mole) of salicylaldehyde and 117 g. (0.5 mole) of p-octyl-o-aminophenol in 200 g. of benzene. The refluxing temperature was 83° C. and was continued until a total of 10 cc. of water was collected. The reaction mixture was filtered and benzene was removed by distillation at 131° C. under water pump vacuum. The Schiff base (N-salicylidene-2-hydroxy-5-octylaniline) was recovered as a reddish solid.

The Schiff base, prepared in the above manner, was reacted with potassium hydroxide and then with nickel chloride. This was effected by charging 82 g. (0.25 mole) of the Schiff base and 32.5 g. (0.5 mole) of potassium hydroxide dissolved in 100 g. of methanol into a reaction flask, to which an additional 200 g. of methanol also was added. The solution was intimately mixed and then 59.425 g. (0.25 mole) of nickel chloride and 50 g. of methanol were gradually added, while continuously stirring the mixture. The mixture was heated to refluxing and the chelate precipitated as an amber green solid. The solid was washed copiously with water and methanol. The chelate contained 14.06% by weight of nickel which corresponds to a theoretical nickel content of 15.43%.

The partial chelate prepared in the above manner was then reacted with isobutyl amine. This reaction was effected by refluxing 23 g. of the nickel-Schiff base, prepared in the above manner, and 14.64 g. of isobutyl amine in 100 g. of methanol for one-half hour. The product was filtered and washed with water. The mixed chelate was recovered as a dark orange solid having a nickel content of about 8.48% by weight.

EXAMPLE II

The chelate of this example was prepared by first forming the nickel chelate of p-t-octyl-o-aminophenol and o-vanillin and then reacting the same with cyclohexyl amine. This preparation was made by first mixing at room temperature 117 g. (0.5 mole) of p-t-octyl-o-aminophenol and 76 g. (0.5 mole) of o-vanillin in 200 g. of benzene, followed by refluxing the mixture. A total of 9.5 cc. of water was collected and the Schiff base was recovered as bright orange crystals.

The Schiff base, prepared in the above manner, was further reacted by charging 66 g. (0.19 mole) of the Schiff base and 200 g. of methanol into a reaction flask and adding thereto 24.8 g. (0.382 mole) of potassium hydroxide dissolved in 100 g. of methanol. The mixture was thoroughly stirred and then 45.8 g. (0.191 mole) of nickel chloride dissolved in 300 g. of methanol was added gradually thereto, with continued stirring. Following completion of the reaction, the product was washed extensively with warm water and warm methanol, and the resultant product was found to have a nickel content of about 11.8% by weight.

The nickel-Schiff base, prepared in the above manner, was then reacted with cyclohexyl amine. This reaction was effected by dissolving 19.05 g. (0.05 mole) of the nickel-Schiff base in 100 g. of methanol and commingling therewith 4.95 g. (0.05 mole) of cyclohexyl amine dissolved in 100 g. of methanol, with continuous stirring. Following completion of the reaction, the product was dissolved in hot methanol and then precipitated upon cooling. The chelate was recovered as a brick red solid having a nickel content of about 10.9% by weight which corresponds to the theoretical nickel content of 11.52% by weight.

EXAMPLE III

The chelate of this example is prepared by first forming the Schiff base of p-sec-decyl-o-aminophenol and o-hydroxyacetophenone and then reacting the Schiff base and p-aminodiphenylamine with cobaltous chloride. The Schiff base is prepared by heating and refluxing equal mole proportions of p-sec-decyl-o-aminophenol and o-hydroxyacetophenone in ethanol solvent for three hours. The resulting precipitate is recovered by filtration and is washed with warm water and ethanol, after which it is air dried.

One mole proportion of the Schiff base, prepared in the above manner, and one mole proportion of p-aminodiphenylamine are reacted with two mole proportions of sodium hydroxide and then with one mole proportion of cobaltous chloride. The chelate is extensively washed with water and then allowed to air dry.

EXAMPLE IV

The chelate of this example is prepared by first forming the Schiff base of 2-hydroxy-4'-methoxybenzophenone and p-pentoxy-o-aminophenol, then reacting with manganese chloride tetrahydrate and finally reacting with dioctyl amine. The Schiff base is prepared by refluxing one mole proportion of 2-hydroxy-4'-methoxybenzophenone with one mole proportion of p-pentoxy-o-aminophenol in the presence of benzene solvent. The precipitate formed in the reaction is removed by vacuum filtration and then is washed with warm water and warm isopropanol, followed by air drying. One mole proportion of the Schiff base, prepared in the above manner, is then reacted with two mole proportions of potassium hydroxide, after which it is reacted with one mole proportion of manganese chloride tetrahydrate dissolved in methanol. The resulting precipitate is washed copiously with warm water, dried, and then is reacted with dioctyl amine in methanol solvent. The chelate is recovered as the precipitate after vacuum filtration and washing with warm water and warm methanol.

EXAMPLE V

The chelate of this example is prepared by reacting cobaltous acetate with the Schiff base prepared by reacting salicylaldehyde and o-aminophenol and with tributyl amine. The Schiff base is prepared in substantially the same manner as hereinbefore set forth. One mole proportion of the Schiff base and three mole proportions of tributyl amine in methanol solvent are first reacted with two mole proportions of potassium hydroxide and then with one mole proportion of cobaltous acetate in methanol solution. The reaction mixture is heated at 75° C., with stirring, for two hours. The resulting chelate is separated by vacuum filtration, washed first with warm water, then with warm methanol and allowed to air dry.

EXAMPLE VI

As hereinbefore set forth, the chelate of the present invention is useful as a weathering agent in plastics. The plastic of this example is solid polypropylene. The solid polypropylene without additive is stated to have properties substantially as follows:

Table I

| | |
|---|---|
| Specific gravity | 0.910–0.920. |
| Refractive index, $n_D^{25}$ | 1.510. |
| Heat distortion temperature: | |
| At 66 p.s.i. load | 116° C. |
| At 264 p.s.i. load | 66° C. |
| Tensile yield strength, p.s.i. (ASTM D638–58T) (0.2″ per min.) | 4700. |
| Total elongation, percent | 300–400. |
| Stiffness flexural (ASTM D747–50) $10^5$ p.s.i. | 1.8. |
| Shore hardness (ASTM D676–55T) | 74D. |

The polypropylene was milled in a two-roll heated mill of conventional commercial design and the additive, when employed, was incorporated in the sample during the milling. The samples were pressed into sheets of about 17 mil. thickness and cut into plaques of about 1⅜″ x 1½″. The plaques were inserted into plastic holders, affixed onto a rotating drum and exposed to carbon arc rays at about 52° C. in a Weather-O-Meter. The samples were examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly increased deterioration.

A sample of the polypropylene without inhibitor developed a carbonyl number of greater than 1000 within 120 hours of exposure in the Weather-O-Meter. Another sample of the same polypropylene containing 0.15% by weight of 2,6-ditertiarybutyl-4-methylphenol developed a carbonyl number over 1000 within 360 hours of exposure in the Weather-O-Meter.

Another sample of the solid polypropylene containing 1% by weight of the chelate of Example I and 0.15% by weight of 2,6-ditertiarybutyl-4-methylphenol was evaluated in the Weather-O-Meter in the same manner. This sample now has been exposed for 1560 hours in the Weather-O-Meter and the carbonyl number is only 122.

EXAMPLE VII

The chelate of Example II also was evaluated in another sample of the polypropylene and in the same manner as described in Example VI. After 1080 hours after exposure in the Weather-O-Meter, the carbonyl number reached 326.

EXAMPLE VIII

The plastic of this example is solid polyethylene of the high density type. An inhibited product of this polyethylene is marketed commercially under the trade name of Fortiflex by the Celanese Corporation of America. A special batch of this polyethylene free of inhibitor is obtained and is cut into plaques in the same manner described in Example VI and evaluated in the Weather-O-Meter. A sample of this polyethylene without inhibitor, when evaluated in the Weather-O-Meter, increases from a carbonyl number of 28 to a carbonyl number of 855 within 624 hours. In contrast, another sample of the polyethylene containing 1% by weight of the chelate of Example IV does not develop a carbonyl number of about 800 for a considerably longer period of time.

EXAMPLE IX

The additive of Example V is incorporated in a concentration of 1% by weight in polystyrene and serves to inhibit deterioration of the polystyrene upon exposure to weathering.

EXAMPLE X

The chelate of Example III is used in a concentration of 0.05% by weight in gasoline and serves to retard oxidative deterioration caused by metal impurities in the gasoline.

I claim as my invention:
1. A chelate of (1) Schiff base of an o-hydroxyaromatic aldehyde and an o-hydroxyaromatic amine, (2) compound selected from the group consisting of alkyl amine, cycloalkyl amine and alkanol amine and (3) a metal of the transition series.
2. A chelate of (1) Schiff base of an o-hydroxyaromatic aldehyde and an o-hydroxyaromatic amine, (2) alkyl amine and (3) a metal of the first transition series of elements.
3. A chelate of (1) Schiff base of salicylaldehyde and p-alkyl-o-aminophenol, (2) alkyl amine and (3) nickel.
4. A chelate of (1) Schiff base of salicylaldehyde and p-octyl-o-aminophenol, (2) isobutyl amine and (3) nickel.
5. A chelate of (1) Schiff base of salicylaldehyde and p-octyl-o-aminophenol, (2) dioctyl amine and (3) nickel.
6. A chelate of (1) Schiff base of an o-hydroxyaromatic aldehyde and an o-hydroxyaromatic amine, (2) alkyl amine and (3) cobalt.
7. Mixed chelate of (1) Schiff base of an o-hydroxyaromatic aldehyde and an o-hydroxyaromatic amine, (2) alkanol amine and (3) a metal of the transition series.
8. Mixed chelate of (1) Schiff base of an o-hydroxyaromatic aldehyde and an o-hydroxyaromatic amine, (2) alkanol amine and (3) nickel.
9. A chelate of (1) Schiff base of an o-hydroxyaromatic aldehyde and an o-hydroxyaromatic amine, (2) cyclohexyl amine and (3) a metal of the first transition series of elements.
10. A chelate of (1) Schiff base of salicylaldehyde and p-alkyl-o-aminophenol, (2) cyclohexyl amine and (3) nickel.

References Cited

UNITED STATES PATENTS

| | | | |
|---|---|---|---|
| 2,116,913 | 5/1938 | Schmidt et al. | 260—11 |
| 2,178,809 | 11/1939 | Rosenblatt | 260—429 |
| 2,345,485 | 3/1944 | Krzikallia et al. | 260—439 |
| 3,215,717 | 11/1965 | Foster | 260—439 |

OTHER REFERENCES

Chaberek et al., Organic Sequestering Agents, John Wiley and Sons, Inc.; New York, N.Y. (1959), pp. 6 to 9 and 26.
Calvin et al., J. Am. Chem. Soc. 68 (1946), p. 2254.
Harvey et al., J. Am. Chem. Soc. 71 (1949), pp. 3641–3.
Bailes et al., J. Am. Chem. Soc. 69 (1947), pp. 1886–9.
Tsumaki, Chem. Soc. Japan Bulletin 13 (1938), pp. 583–90.
Pfeiffer et al., Annalen de Chem. 503 (1933), p. 91.

TOBIAS E. LEVOW, *Primary Examiner.*

A. P. DEMERS, *Assistant Examiner.*